(12) United States Patent
Naohara et al.

(10) Patent No.: US 6,836,385 B2
(45) Date of Patent: Dec. 28, 2004

(54) RECORDING/REPRODUCING APPARATUS

(75) Inventors: Shinichi Naohara, Saitama (JP); Yasutaka Suzuki, Saitama (JP); Kazunori Matsuo, Saitama (JP); Tomomichi Kimura, Saitama (JP)

(73) Assignee: Pioneer Corporation, Tokyo (JP)

( * ) Notice: Subject to any disclaimer, the term of this patent is extended or adjusted under 35 U.S.C. 154(b) by 304 days.

(21) Appl. No.: 09/725,266

(22) Filed: Nov. 29, 2000

(65) Prior Publication Data

US 2001/0008471 A1 Jul. 19, 2001

(30) Foreign Application Priority Data

Nov. 29, 1999 (JP) .......................................... 11-337988

(51) Int. Cl.$^7$ ................................................ G11B 5/09
(52) U.S. Cl. ......................................... 360/15; 360/69
(58) Field of Search .............................. 360/15, 60, 69; 369/30.02, 30.05–30.08, 30.19, 30.23

(56) References Cited

U.S. PATENT DOCUMENTS

| | | | | |
|---|---|---|---|---|
| 5,661,706 A | * | 8/1997 | Ohtomo | .................. 369/54 |
| 5,768,236 A | * | 6/1998 | Kihara | .................. 369/124.14 |
| 6,094,647 A | * | 7/2000 | Kato et al. | .................. 707/2 |
| 6,292,626 B1 | * | 9/2001 | Ino et al. | .................. 386/125 |
| 6,389,399 B1 | * | 5/2002 | Yasuda | .................. 704/500 |
| 6,449,226 B1 | * | 9/2002 | Kumagai | .................. 369/47.1 |

FOREIGN PATENT DOCUMENTS

JP 09134586 * 5/1997

* cited by examiner

*Primary Examiner*—Sinh Tran
*Assistant Examiner*—Varsha A. Kapadia
(74) *Attorney, Agent, or Firm*—Sughrue Mion, PLLC

(57) ABSTRACT

Partial information such as the beginning data of each of chapters is read from a CD and written in a HDD 10 at a higher speed than that in a normal reproduction while the normal reproduction is carried out using a buffer memory 8. After the chapters relative to all CDs have been written in the HDD 10, reproduction is carried out in switching between the information remaining in the HDD 10 and the information included in the CD. This configuration makes it unnecessary to record the information beforehand, and permits an unreproducible blank in reproduction to be filled with audio information during track search or CD change while the reproduction is carried out normally.

23 Claims, 11 Drawing Sheets

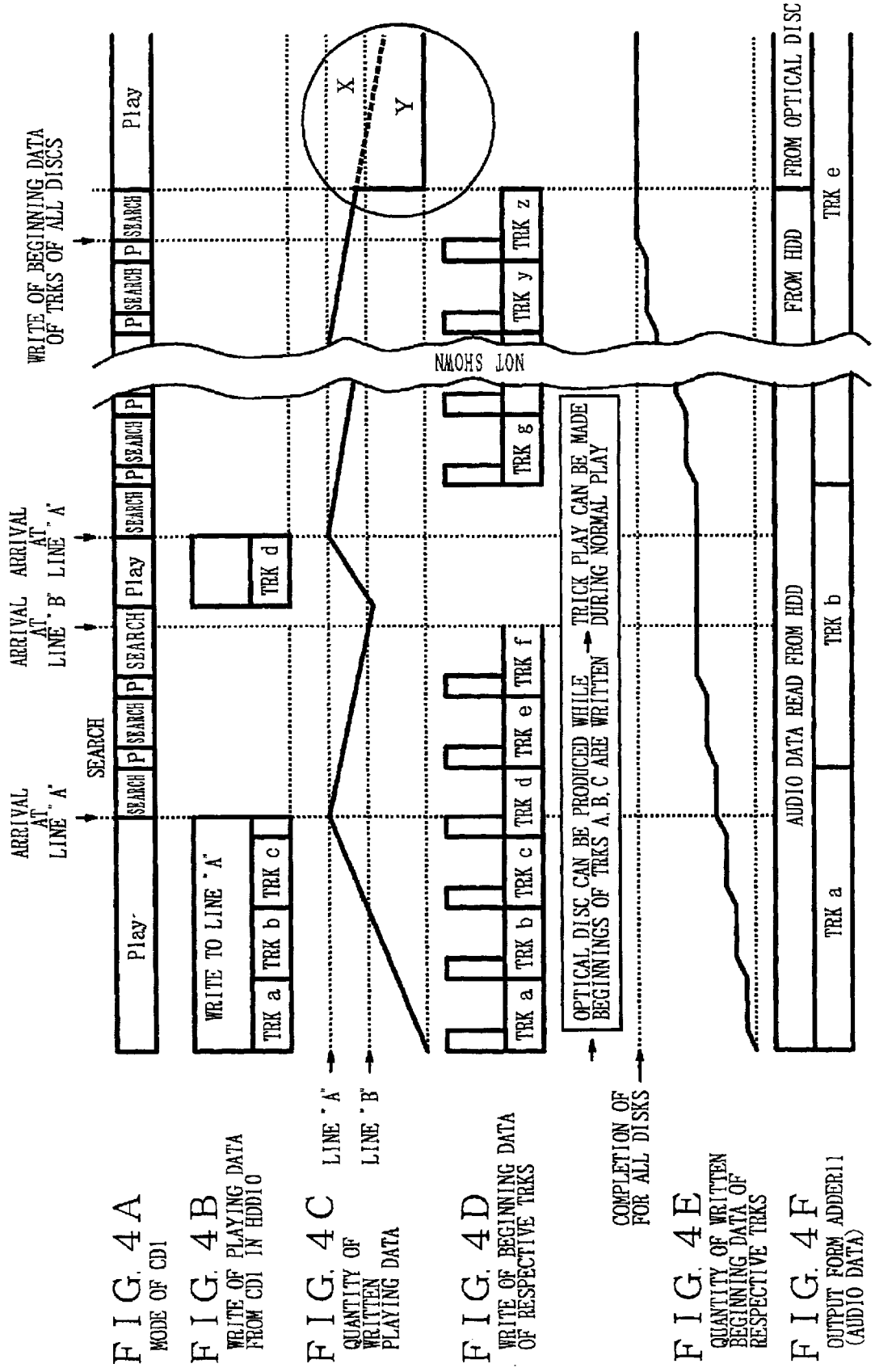

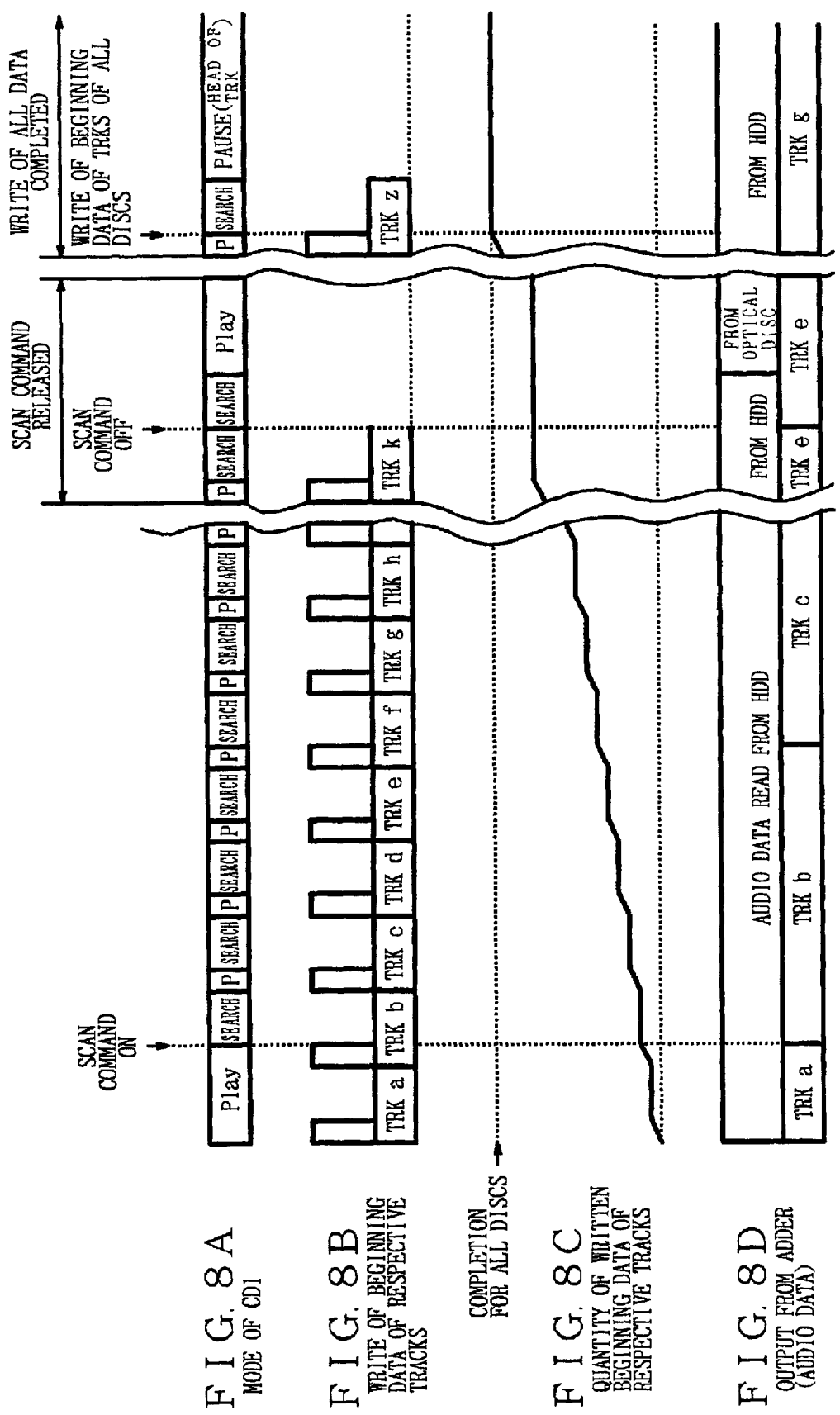

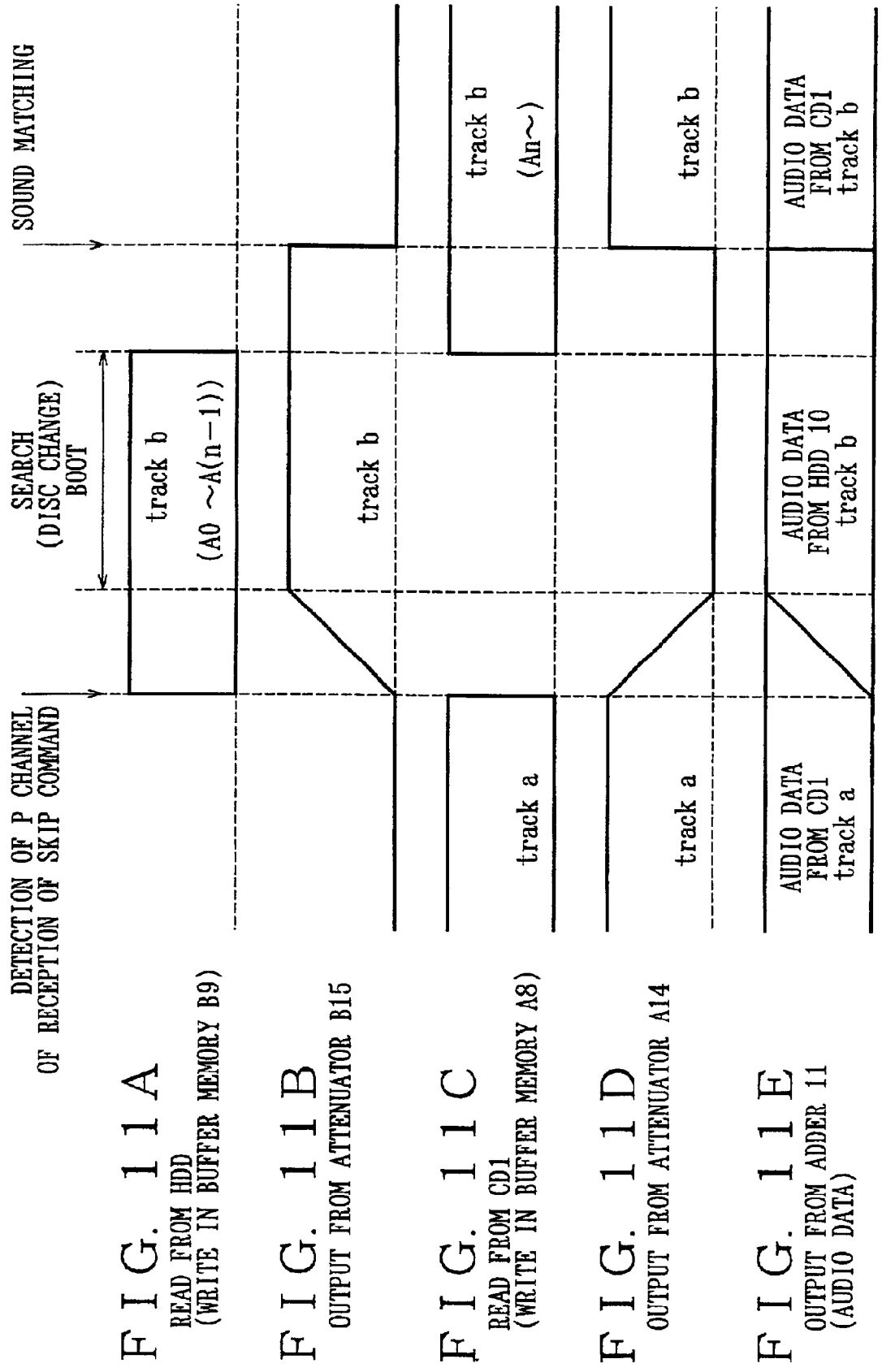

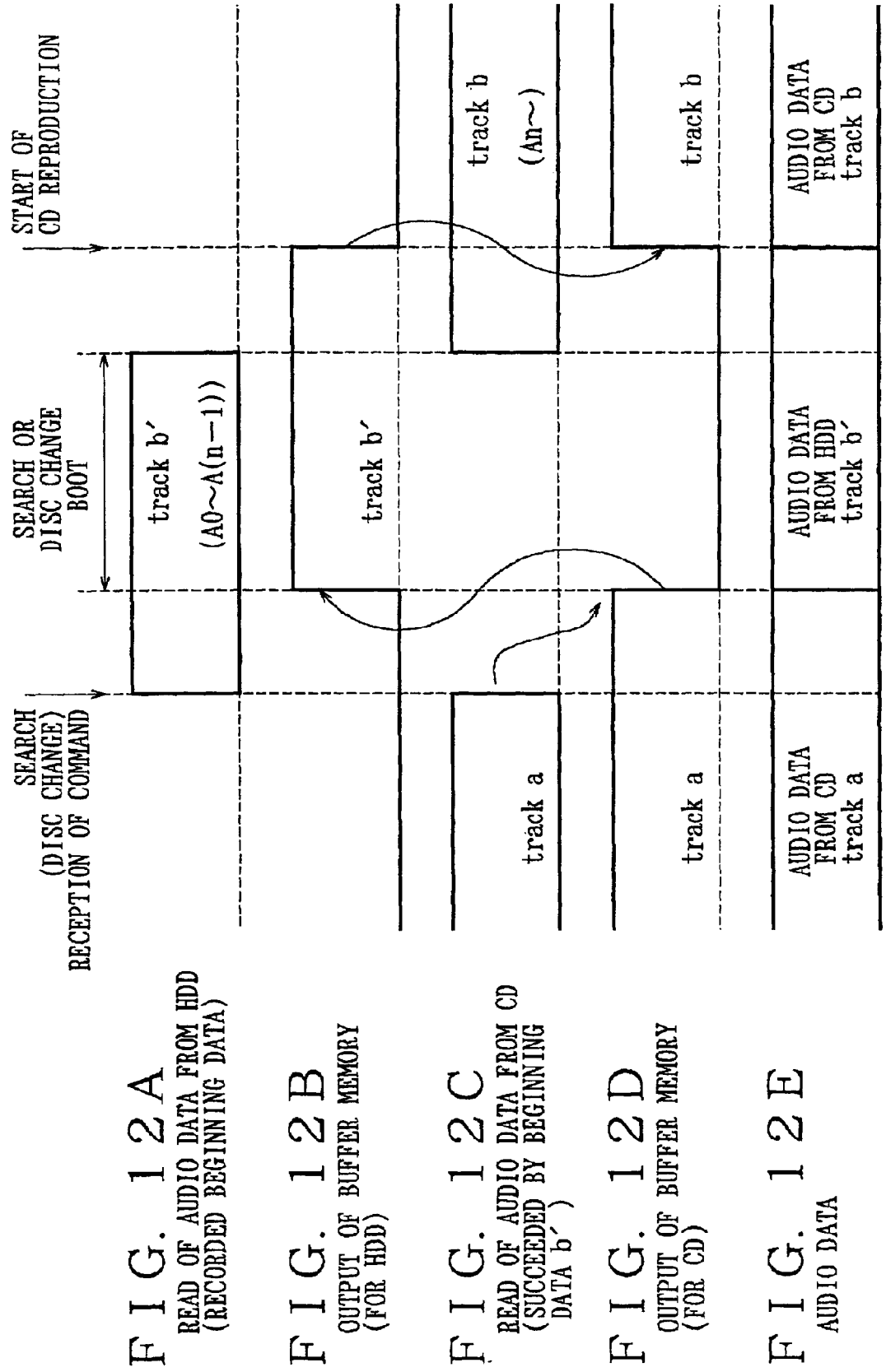

RECORDING/REPRODUCING APPARATUS

BACKGROUND OF THE INVENTION

1. Field of the Invention

The present invention relates to a recording/reproducing apparatus which can record/reproduce the beginning of a recording medium such as a CD or the beginning of each track into/from a magnetic storage medium such as a hard disk drive (HDD).

2. Description of the Related Art

In recent years, with development of the high density and low-price of a hard disk (HDD), the hard disk has been not only used as an external storage device of a personal computer but also used to store a large amount of sound contents. Many acoustic products have become available in the market.

For example, there is a music editing apparatus in which all the audio data written in a recording medium such as a compact disk (CD) loaded in a changer are previously written in a HDD in the digital form, and the written audio data are/read reproduced from the HDD. Although such an apparatus becomes large in size, it can reproduce the audio data from the HDD and hence does not require for the CD to be changed, thereby realizing comfortable continuous playback of music.

In order that music playback is not stopped during the track search or CD change in an ordinary CD changer, a reproducing apparatus in which the beginning audio data of a CD written previously in the HDD are read for playback and replaced by the audio data of the CD after track search or CD change has been completed. Such a reproducing apparatus is disclosed in JP-A-134586.

The control in the above conventional reproducing device is shown in a timing chart of FIG. 12. Now it is assumed that the beginning data of each of tracks ($A_0$–$A_{(n-1)}$) is previously written in a HDD and searching is performed from a certain track (track a) to another track (track b).

First, while the audio data on the track a of a certain CD is reproduced, it is read by a pick-up unit 2 and written in a buffer memory (FIG. 12C). The audio data is read from the buffer memory and played back through a speaker (FIGS. 12D and 12E).

At this time, when a track search (or disk change) command is received, the audio data at the beginning (track b') of the track b of the CD to be reproduced subsequently is read (FIG. 12A), and the audio data thus read is written in the buffer memory. The read of the audio data from the buffer memory is started and the audio data sequentially read from the buffer memory is produced as the reproduced sound at the beginning of the track to be subsequently reproduced (FIG. 12B). Meanwhile, the booting for track search or disk change is performed.

Upon completion of the booting, the read of the audio data by the pickup unit is started from the track b (FIG. 12C), and the audio data thus read is written in the buffer memory. The write of the audio data is made from the data at the address successive to the data at a pertinent address of the track, for example the data from an address A10 if the pertinent address is A9 at ten second relative to the track b (n=10). Thereafter, the audio data is read sequentially from the buffer memory by the normal playback (FIG. 12D).

As a result, as seen from (FIG. 12E), without stopping the playing during the track search or CD change, the playback can be performed in the sequence of the audio data (track a) from the CD, the audio data from the HDD (track b') and audio data (track b) from the CD.

In order to perform the playback continuously without stopping the playing during the track search or CD change, the above conventional recording/reproducing apparatus requires an operation of previously recording the information relative to the beginnings in the recording medium in an HDD.

SUMMARY OF THE INVENTION

An object of the present invention is to provide a recording/reproducing apparatus capable of effectively recording the information relative to beginnings in a recording medium such as a CD.

In order to attain the above object, there is provided a recording/reproducing apparatus comprising:

storage means for storing information read from a recording medium on which the information is written in a prescribed number of groups;

means for reading the information on said recording medium; and control means for controlling the write in said storage means of at least a prescribed time of information corresponding to a beginning address of each of said groups.

Preferably, said means for reading reads the information on said recording medium at a speed of N-times as high as a normal speed.

Preferably, said control means controls the write of the information read from said recording medium while it controls reproduction of the information written in said storage means at any time.

Preferably, said control means causes a prescribed time of information of the information written in said storage means to be held therein and the other information to be discarded after reproduction.

Preferably, said control means correlatively manages said prescribed time of information written in said storage means and the recording medium in which it has been written.

Preferably, the recording/reproducing apparatus comprises: means for detecting identification information for identifying said recording medium, and where said prescribed time of information contained in the recording medium identified by said identifying means has been already written in said storage means, said control means inhibits write of the information into said storage means.

Preferably, the recording/reproducing apparatus further comprises: a holding member for holding a plurality of recording media, and said control means causes said storage means to store said prescribed time of information relative to all said recording media held in said holding member.

Preferably, after said control means causes said storage means to store said prescribed time of information relative to all said recording media held in said holding member, it continues reproduction using the information remaining in said storage means.

Preferably, after said control means causes said storage means to store said prescribed time of information relative to all said recording media held in said holding portion, it continues reproduction using the information recording in said recording media.

Preferably, said recording means is a compact disk and said storage means is a hard disk drive.

In accordance with the configuration of the present invention; partial information such as the beginning data of each of chapters is read from a recording medium and written in storage medium at a higher speed than that in a normal reproduction while the normal reproduction is carried out using a buffer memory. This configuration makes it unnecessary to record the information beforehand, and permits a unreproduciable blank in reproduction to be filled with audio information during track search or CD change while the reproduction is carried out normally. After the chapters relative to all CDs have been written in the HDD, reproduction is carried out using the information remaining in the HDD. This reproduction is more resistant to external disturbance than the case of reproduction using an optical pick-up. Otherwise, after the chapters relative to all CDs have been written in the HDD, reproduction is carried out using the information written in the CDs. This reproduction does not require the read/write of the information for the HDD, and hence realizes power saving. The present invention can be applied to not only the normal reproduction but also to the trick play such as shuffle, scan, etc. Therefore, continuous reproduction can be realized without stopping the playing during track/disk searching or disk changing.

The above and other objects and features of the invention will be more apparent from the following description taken in conjunction with the accompanying drawings.

BRIEF DESCRIPTION OF THE DRAWINGS

FIGS. 4A–4F are timing charts for explaining the operation of normal reproduction in an embodiment of the invention;

FIGS. 8A–8D are timing charts for explaining the operation of trick playback in an embodiment of the invention;

FIGS. 11A–11E are timing charts for explaining the operation of another embodiment of the invention; and FIGS. 12A–12E is a timing chart for explaining the operation of a conventional recording/reproducing apparatus.

DESCRIPTION OF THE PREFERRED EMBODIMENTS

Figure 1:
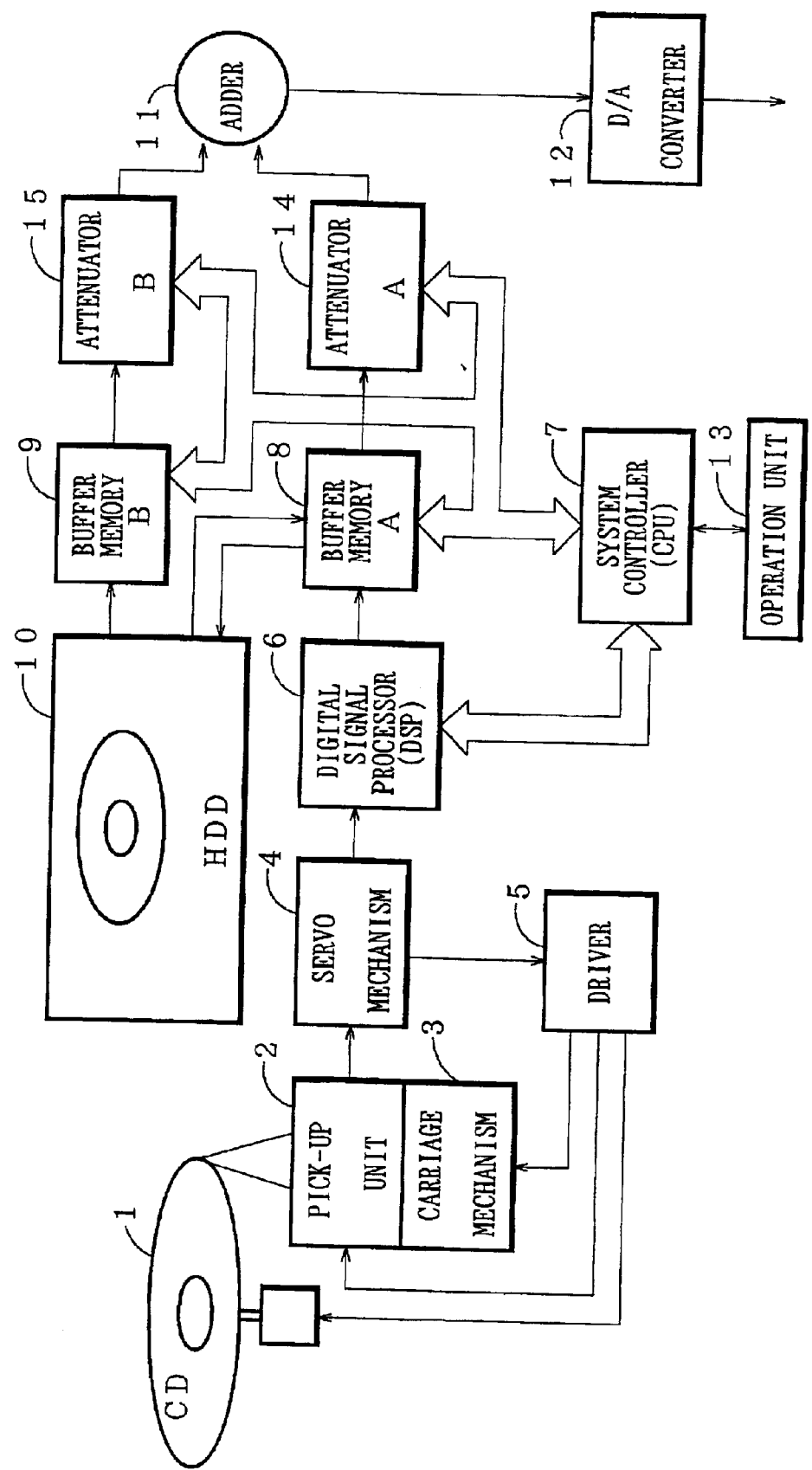
FIG. 1 is a block diagram showing the basic arrangement of a recording/reproducing apparatus according to the invention.

Now referring to the drawings, an explanation will be given of various embodiments of the invention.

FIG. 1 is a block diagram of an recording/reproducing apparatus according to an embodiment of the invention.

In this embodiment, an optical disk 1 (CD: compact disk) on which audio data are written is adopted as a recording medium. In operation, when CD 1 is loaded on a disk table, it is rotated at a constant speed by a spindle motor during playback. The data written in a bit form in the CD are read by a pickup unit and supplied to a RF amplifier (not shown).

The pickup unit 2 is loaded on a carriage mechanism 3 and driven by a driver 5 which is controlled by a servo mechanism 4. The pickup unit 2 further incorporates an optical system composed of a laser diode, a polarizing beam splitter and an objective lens, a detector for detecting reflected light, etc. An output from the RF amplifier is supplied to a digital signal processor (DSP) incorporating a decoder.

The servo mechanism 4 creates various kinds of servo drive signals of focus, tracking and spindle on the basis of a focus error signal and tracking error signal from the RF amplifier and a spindle error signal from the decoder, and controls the driver 5 to perform various servo operations. The reproduced RF signal produced from the RF amplifier is supplied to the decoder incorporated in the DSP 6. The decoder performs EFM (Eight to Fourteen Modulation) demodulation, CIRC (Cross interleave Readsolomon Code) decoding, etc. to decode the information read from the CD1 into the format of digital audio data. The digital audio data produced from the decoder is once written into a buffer memory (A) 8. The audio data read from the buffer memory (A) 8 is supplied to a D/A converter 12 via an attenuator (A) 14 and an adder 11 under the control by a system controller (CPU) 7. The analog audio data from the D/A converter 12 is supplied to predetermined audio output components, e.g. a speaker or headphone output terminal through a volume adjusting circuit and an amplifier.

The audio data read from the buffer memory (A) 8 is also supplied to a HDD (hard disk drive) 11 under the control by the system controller 7. Thus, the audio data is written on the HDD 10. The audio data read from the HDD 10 is supplied to the buffer memory (A) 8 or buffer memory (B) 9 under the control by the controller 7. The audio data is supplied to the D/A converter 12 via the adder 11 through the attenuator (A) 14 or attenuator (B) 15 which will be described later. The analog audio data from the D/A converter 12 is supplied to predetermined audio output components, e.g. a speaker or headphone output terminal through a volume adjusting circuit and an amplifier.

The data transfer between the HDD 10 and the buffer memory (B) 9, the data transfer between the DSP 6 and buffer memory (A) 8 and the reproduction of the CD 1 are controlled by the system controller 7. The system controller 7, which has a CPU serving as a center of control, includes a program memory, a data memory and an input/output port. The system controller 7 performs the data transfer between the HDD 10 and the buffer memory (B) 9 and the data transfer between the DSP 6 and buffer memory (A) 8 according to the program written in a program memory. The system controller 7 implements the start or end of reproduction, track access, fast-forward playback, fast-backward playback, program playback, etc. by controlling the DSP 6 or pick-up unit 2.

The system controller 7 also determines the attenuating amount or amplifying amount in the attenuator (A) 14 and the attenuator (B) 15 to which the outputs from the buffer memory (A) 8 and the buffer memory (B) 9 are supplied. The details thereof will be described later.

An operation unit 13 includes an LCD display and an operation key. The operation unit 13 has keys allotted to various operations, e.g. a playback key, track access key, stop key, etc. The operation unit 13 has also a key for selecting one to be reproduced from a plurality of CDs, a key for program playback and a key for random playback. The LCD display displays various items of information to be processed by the system controller in interlock with these keys. Namely, the operation unit 13 serves to realize a man-machine interface.

METHOD OF RECORDING BEGINNING DATA (1). Method of Recording the Beginning Data During Normal Playback FIGS. 2 to 4 and FIG. 7 are views for explaining the operation of an embodiment of the invention shown in FIG. 1. Now assuming that the recording/reproducing apparatus embodying the invention is a magazine type CD changer, the processing procedure will be explained.

Figure 2:
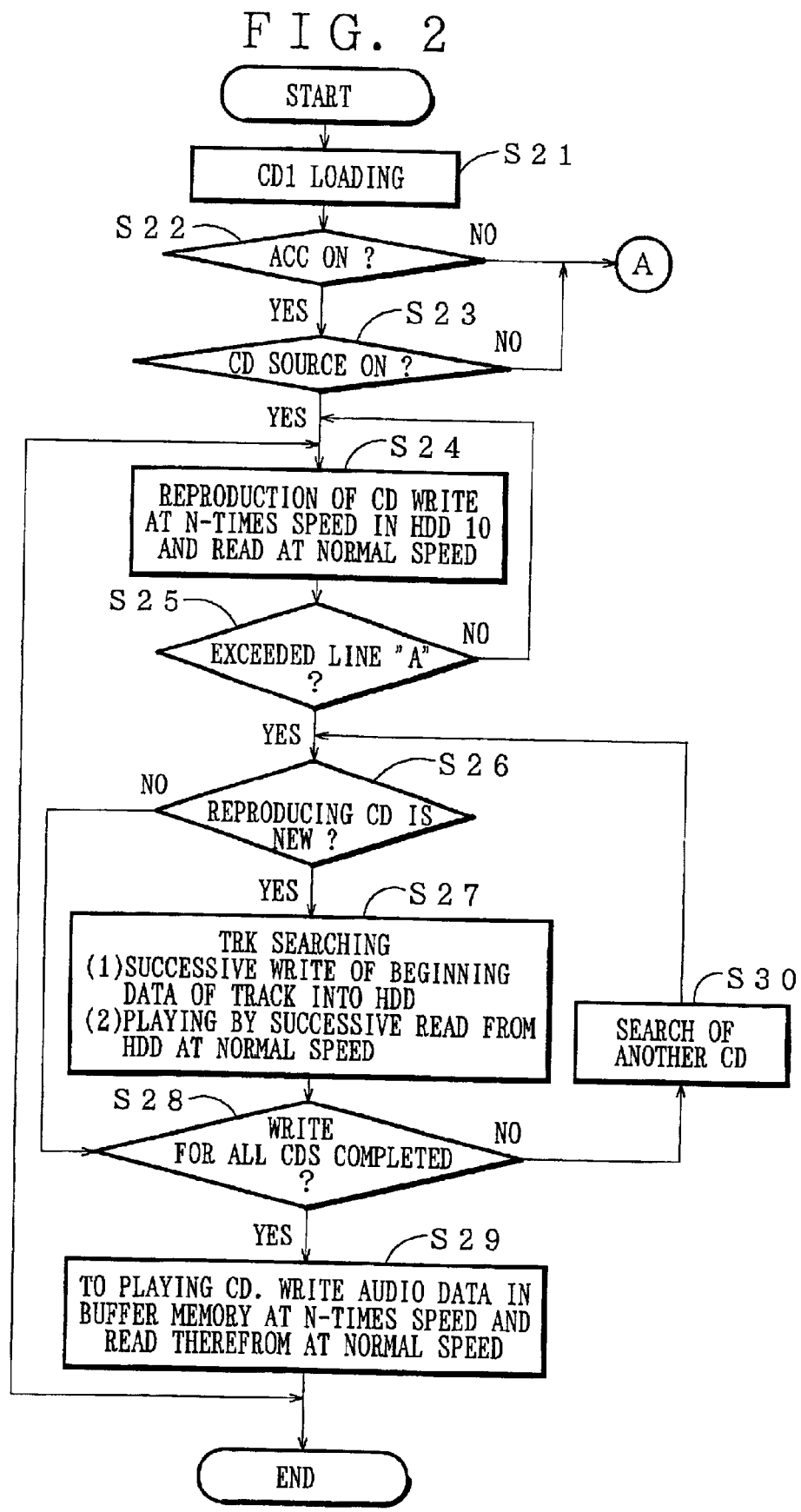
FIGS. 2 and 3 are flowcharts each for explaining the operation of normal reproduction in an embodiment of the invention.
Figure 3:
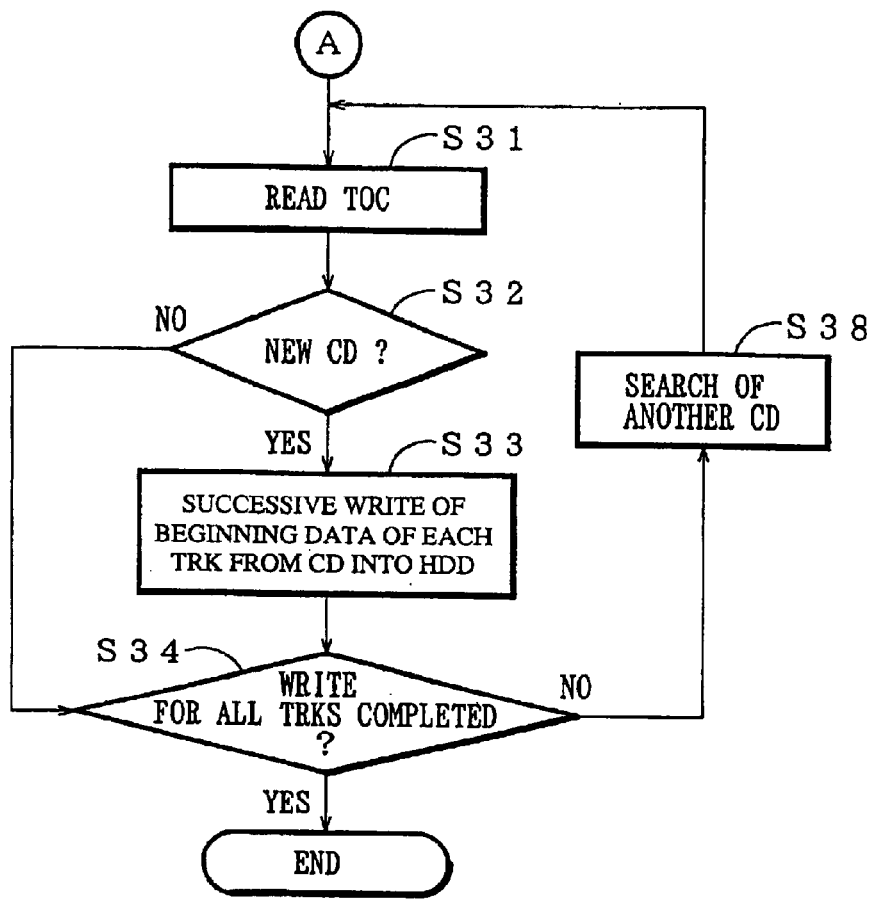
Figure 7:
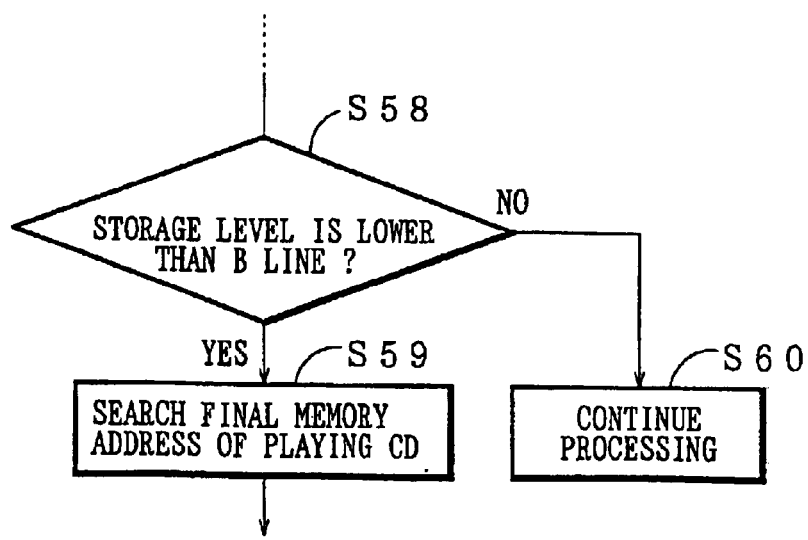
FIG. 7 is a flowchart for explaining the operation of normal reproduction and trick playback in an embodiment of the invention.

The flowcharts shown in FIGS. 2, 3 and 7 are written in the program memory incorporated in the system controller 7 shown in FIG. 1.

First, a CD 1 is loaded to a clamping position for preparation of normal playback (step S21).

Next, the system controller 7 decides whether or not an accessory power supply (ACC) "ON" and an CD source "ON" (steps S22, S23). When it is verified that they are "ON", the system controller 7 starts the playback operation of the CD 1. Now it is assumed that audio data of the CD 1 is written in the HDD 10 while the CD 1 is reproduced. Specifically, the audio data on the CD 1 is read at a speed of N-times (N>1), and the audio data thus read is written in the HDD 10 via the buffer memory (A) 8. Thereafter, the audio data written on the HDD 10 is supplied to the buffer memory (A) 8 again at the speed of N-times. The audio data is read from the buffer memory (A) 8 at a normal or standard speed to effect the playback operation (step S24). Incidentally, the data written in the HDD 10 is composed of the audio data and the corresponding address data. The audio data reproduced from the pick-up unit 2 and the corresponding address data will be written successively in the HDD 10. All these data may be left or held in the HDD. As regards the audio data read from the buffer memory (A) 8 at the normal speed, only its beginning data (beginning audio data and the corresponding address data) may be left. In short, any recording format can be adopted as long as at least the beginning data remains held in the HDD 10.

It is decided whether or not a prescribed or more quantity (quantity) of the audio data has been written in the HDD 10 (step S25). Since only the prescribed quantity of the audio data can be written in the HDD 10, "A-line check" is made (which will be described later referring to the timing chart of FIG. 4). When it is verified that the prescribed or more quantity of audio data has been written, the read of the audio data from the CD 1 at the speed of N times is temporarily stopped.

When the read of the audio data is temporarily stopped, it is determined whether or not the CD 1 which is now being reproduced is a new CD (step S26). The new CD refers to a CD loaded first in the magazine. If the CD at issue is a CD loaded previously in the magazine and having the beginning data already written in the HDD 1, the answer instep S26 is NO. Incidentally, this determination is made, for example by checking the flag for the absolute time (total time) of the CD or checking the individual ID appended to each CD. The checking of the CD is carried out to omit the write of the beginning data already written in the HDD 10 when the new CD is loaded again.

If the CD at issue is a new CD, a track subsequent to track written in the HDD is searched so that the beginning prescribed time of data (hereinafter referred to as beginning data) of the respective tracks are sequentially written into the HDD 10. Meanwhile, the playback will be continued by reading the data at the normal speed from the HDD 10. The timings of the playback and write will be described later (step S27). The data written into the HDD 10 is composed of ID of the CD, absolute time of the CD, beginning data for each track and the corresponding address data. As regards the old CD with the beginning data written in the HDD 10 (for example, the absolute time has been written as a flag in the HDD 10) the write of the beginning data can be omitted when the old CD is loaded again.

In step S28, whether or not the record has been completed for all the CDs is determined since it is assumed that the CD changer is used. According to the result of the determination, if YES, the processing proceeds to normal CD playback (step S29) whereas if NO, the processing proceeds to searching of another CD (step S30). In this case, it is not required the normal playback processing is performed at the speed of N-times.

On the other hand, if the ACC is not "ON", or CD is not "ON" (namely, the engine is not operating, or the other source (tuner, tape, etc.) than the CD has been selected and the CD has been already loaded), the CD 1 is not reproduced but only its beginning data are written). To this end, TOC (Table of Contents) of the loaded CD 1 is read (step S31). Whether or not the CD is an new CD is determined (step S32). If YES in step S32, the beginning data of the tracks of the CD 1 are successively written in the HDD 10 (step S38). Whether or not the write has been completed for the tracks of all the CDs is determined (step S34). If YES, the processing of writing the beginning data into HDD 10 is ended. If NO, another CD is searched (step S38). Thus, also when the ACC is off or the other source than the CD is activated, the beginning data in the magazine will be automatically written into the HDD 10.

On the way of steps S26 to S28, checking of B line is performed as shown in the flowchart of FIG. 7 (the details will be explained with reference to the timing chart of FIG. 4). Specifically, first, whether or not the quantity of written data in the memory is not more than a prescribed value (B line) (step S58). If YES (not more than the B lines), the final memory address of the CD 1 is searched and the processing of step S24 et seq. is repeated. If NO, the processing of writing only the beginning data of each track into the HDD 10 during the normal playback is continued (step S60).

In the flowchart of FIG. 2, although disk discrimination (NEW or OLD) is made after the prescribed quantity of written data has been written in the HDD 10, it may be made during the processing in step S24.

FIGS. 4A to 4F are timing charts showing the method of recording beginning data of the respective tracks during normal playback of the CD.

Specifically, FIG. 4A shows the operation mode of the CD (playback/search). FIG. 4B shows the data (data for normal playing (playing data x) written from the CD1 into the HDD10. FIG. 4C shows the quantity of written data (of the playing data x) in the HDD 10. FIG. 4D shows the beginning data of each track (data y) written from the CD1 into the HDD 10. FIG. 4E shows the quantity of written data relative to the beginning data. FIG. 4F shows the output (audio data) from the adder 11.

Incidentally, symbol x and symbol y represent whether the all the audio data or only the beginning data of the respective tracks are written from the CD1 into the HDD 10.

FIGS. 4A to 4F illustrate that the playback mode (P) and the search mode are alternately repeated so that the CD 1 is played back while the beginning data of the respective tracks (a–z) are successively written. Lines for checking the quantities of written data are formed because the HDD 10 can record only a prescribed quantity of data.

First, the reproduction of the CD 1 is carried out at the speed of N-times successively from the first track (track a) Specifically, the audio data of track a (TRK a), track b (TRK b) and track c (TRK c) are successively written at the speed of N-times into the HDD 10. As a result, the mount of data within the HDD 10 is gradually increased (FIG. 4C). Simultaneously, the audio data on the track a is read from the HDD 10 at the speed of N-times, and supplied to the buffer memory (A) 8. The audio data is read from the buffer memory (A) 8 and reproduced at the normal speed through the attenuator (A) 14 and adder 11.

On the way of the above operation, when the quantity of written data of the HDD 10 reaches a prescribed quantity (A line) the read from the pick-up unit 2 is temporarily stopped. Since the normal playback is continued, the quantity of the written audio data decreases gradually (FIG. 4C). In this example, when the audio data of the fourth track (track d) is being written in the HDD 10, the quantity of written audio data of the HDD 10 reaches the A line. At this point, the read from the pick-up unit 2 is temporarily stopped. In this state, the first track is played back normally and the beginning data have been written until the fourth track.

With a progression of the normal playback, the quantity of written data in the HDD 10 decreases. Therefore, for the time being, the operation of acquiring only the beginning data of the subsequent track (TRK e) et seq. is started. Specifically, since the audio data of the three tracks have been actually acquired, it is not necessary to acquire the audio data further so that only the beginning data will be acquired precedently. Therefore, the fifth track (track e) is searched and only its beginning data is written. Subsequently, the sixth track (track f) is searched and only its beginning data is written. When the quantity of written data in the HDD 10 reaches B line, the operation of acquiring the audio data of the fourth track is started again. From now on, the above operation will be repeated.

Incidentally, as regards the audio data for playing after the beginning data of all the tracks have been written in the HDD 10, there are two cases where playing is continued using the audio data remaining in the HDD 10 as indicated by symbol X and where the audio data from the pick-up unit 2 is used instead of that in the HDD 10 as indicated by symbol Y. The former is resistant to external disturbance whereas the latter is useful to save power since the CD 1 is used.

In this way, the beginning data of the respective tracks can be written in the HDD 10 while the normal playback is carried out at the speed of N-times. As seen from FIG. 4E, the beginning data of the respective tracks are accumulated gradually.

(2) Method of Recording Beginning Data During Trick Playback

Figure 5:
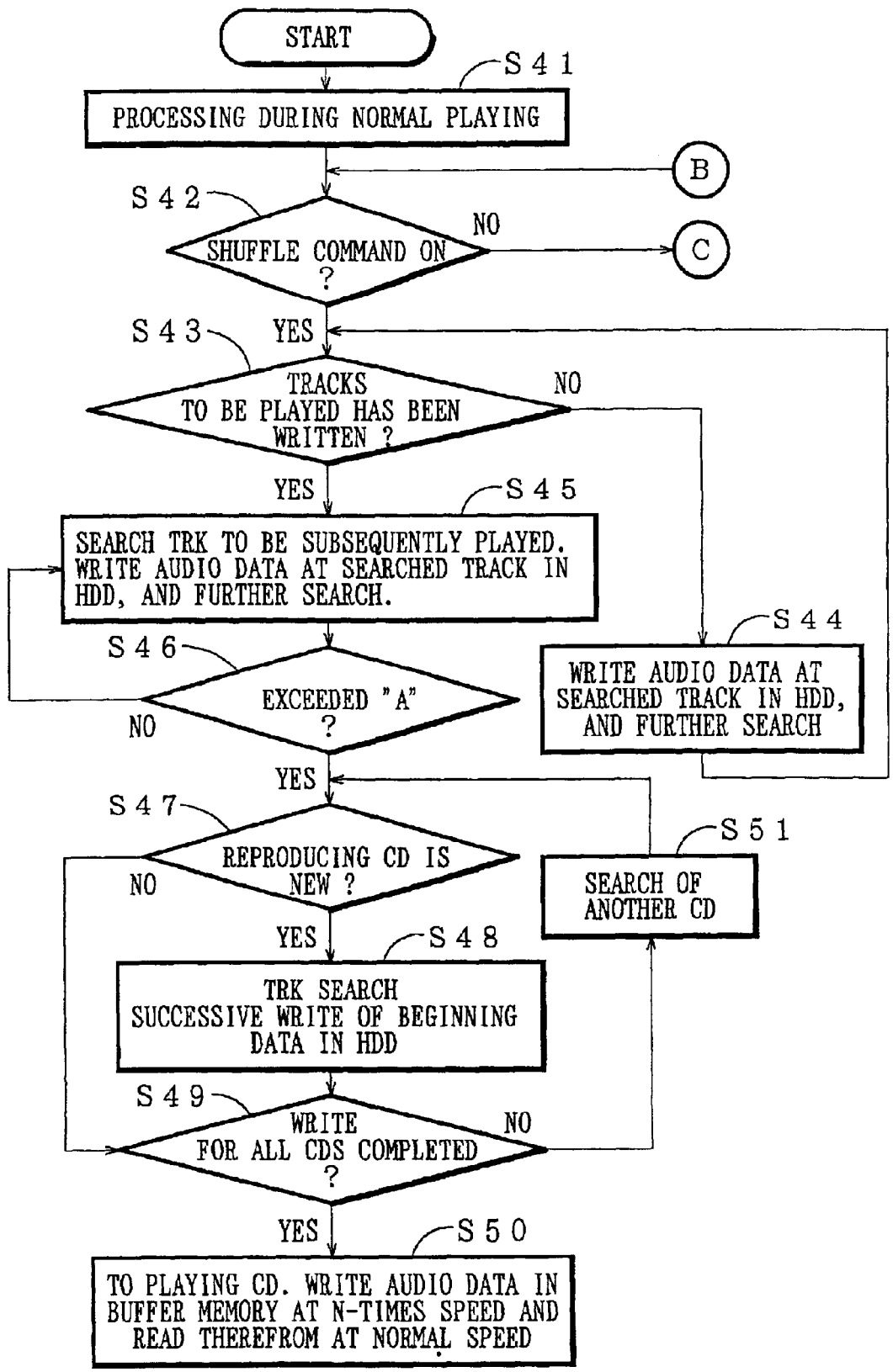
FIGS. 5 and 6 are flowcharts each for explaining the operation of trick reproduction in an embodiment of the invention.
Figure 6:
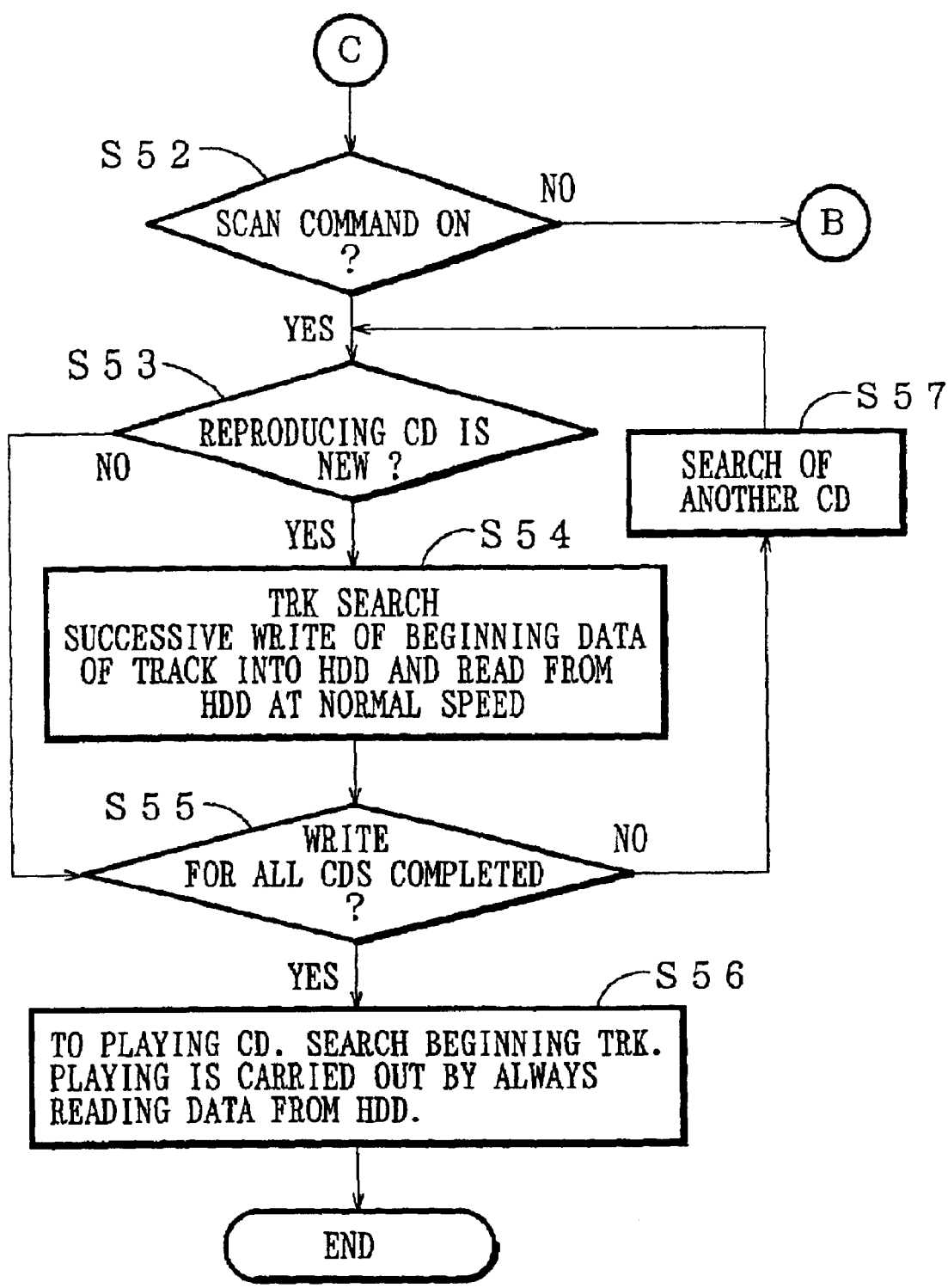

FIGS. 5 to 7 are flowcharts showing the processing procedure of the system controller 7 during the trick playback of shuffle, scan command, etc. FIGS. 8A to 8D are timing charts of this processing procedure. Specifically, FIG. 8A shows the operation mode of the CD. FIG. 8B shows the beginning data written from the CD1 into the HDD 10. FIG. 8C shows the quantity of written audio data (relative to the beginning data of the respective tracks). FIG. 4F shows the output (audio data) from the adder 11. Timings in the shuffle playback which are substantially the same as in the normal playback are not illustrated, but only the scan operation is illustrated.

Now referring to FIGS. 5–8, an explanation will be given of the operation during the trick playback for the recording/reproducing apparatus shown in FIG. 1. The "shuffle" refers to the programming playback and random playback, and the "scan" refers to continuous playback of only the beginning of each CD.

In FIG. 5, during the processing of normal playback (FIGS. 2 and 3) (step S41), it is decided whether or not the shuffle operation such as the programming playback and random playback has been instructed by a user (step S42). If YES, it is determined whether or not all the playing tracks which are now being played back have been written in the HDD 10 (step S43). If NO, the playing track(s) is read from the CD 1 and the audio data thus read is written into the HDD 10. Thereafter, the audio data written in the HDD 10 is supplied to the buffer memory (A) 8 again at the speed of N-times. The audio data is read from the buffer memory (A) 8 at a normal speed to effect the playback of the playing track (step S44). In step S43, if YES, a playing track designated by shuffle is searched and the corresponding audio data is written into the HDD 10. Further, the track to be played subsequently is searched (step S45). The beginning data written in the HDD 10 is composed of the audio data and the corresponding address data.

It is decided whether or not a prescribed or higher quantity the audio data has been written in the HDD 10 (step S46). Since only the prescribed amount of the audio data can be written in the HDD 10, "A-line check" is made. When it is verified that the prescribed or higher quantity of the audio data has been written, it is determined whether or not the CD 1 which is now being reproduced is a new CD (step S47). If the CD at issue is a new CD, the beginning data are successively written into the HDD 10 after track searching (step S48). Incidentally, the data written into the HDD 10 is composed of ID of the CD, absolute time of the CD, beginning audio data for each track and the corresponding address data. In the case of shuffle, only the programmed track is read at the speed of N-times and the beginning data is written. As regards the old CD with the beginning data written in the HDD 10 (for example, the absolute time has been written as a flag in the HDD 10) the write of the beginning data can be omitted when the old CD is loaded again.

Now since it is assumed that the CD changer is used, whether or not the write has been completed for all the CDs is determined (step S49). According to the result of the determination, if YES, the processing proceeds to the CD reproduction processing (step S50), whereas if NO, the processing proceeds to searching of another CD (step S51). In this case, the playing CD is written in the buffer memory (A) 8 at the speed of N-times not via the HDD 10, and read at the normal speed from the buffer memory (A)8.

On the other hand, in step S42, if NO (the shuffle command is not ON), the processing proceeds to step S52 (FIG. 6). In step S52, whether or not the scan command is ON is determined. If YES, it is decided whether or not the CD 1 which is being reproduced is a new CD (step S53). If YES, track search is carried out and the beginning audio data are successively written into the HDD 10 at the speed of N-times and read from the buffer memory (A) 8 at the normal speed. Incidentally, the data written in the HDD 10 is composed of the same audio data reproduced from the pick-up unit 2 and the corresponding address data. It is determined whether or not the write has been carried out for all the CDs (step S55). According to the result of the determination, if YES, the processing proceeds to the CD reproduction processing (step S56), whereas if NO, the processing proceeds to searching of another CD (step S57). In the reproduction of the CD, the beginning of the playing track is searched and the playback is performed in such a manner that the audio data is read from the HDD 10 and reproduced via the buffer memory (B) 9.

As seen from the timing chart of FIG. 8, if a scan releasing command is issued while the scan command is being processed, the playing track is reproduced again from its beginning on the basis of the data read from the HDD 10 through the buffer memory (B) 9. In the mean time, the playing track to be reproduced subsequently in the CD 1 is searched.

On the way of steps S47 to S49, it is determined whether or not the quantity of written data in the HDD 10 is not higher than a prescribed quantity (B line). If YES (not higher than B line), the final memory address of the playing CD is searched. If NO, the write of the beginning data into the HDD 10 during the trick playing is continued.

In this way, in accordance with the present invention, the beginning audio data of the respective tracks of the CD are written during the normal playback or the trick playback.

In this embodiment, although the beginning audio data of each of the tracks of the CD was written, only the beginning audio data of each of the CDs may be written. This technique can be applied to the other recording medium such as MD and DVD.

The other data such as video data or textual data than the audio data may be used for the same purpose. In this case, the beginning data may be written for each group, chapter and title.

In this embodiment, in order to write the beginning data, the HDD 10 was provided in the reproducing apparatus. However, another inner storage means may be used as long as it can record the beginning data.

Cross Fade Processing

An explanation will be given of the processing of special playback (cross fade processing) using the beginning data.

Figure 9:
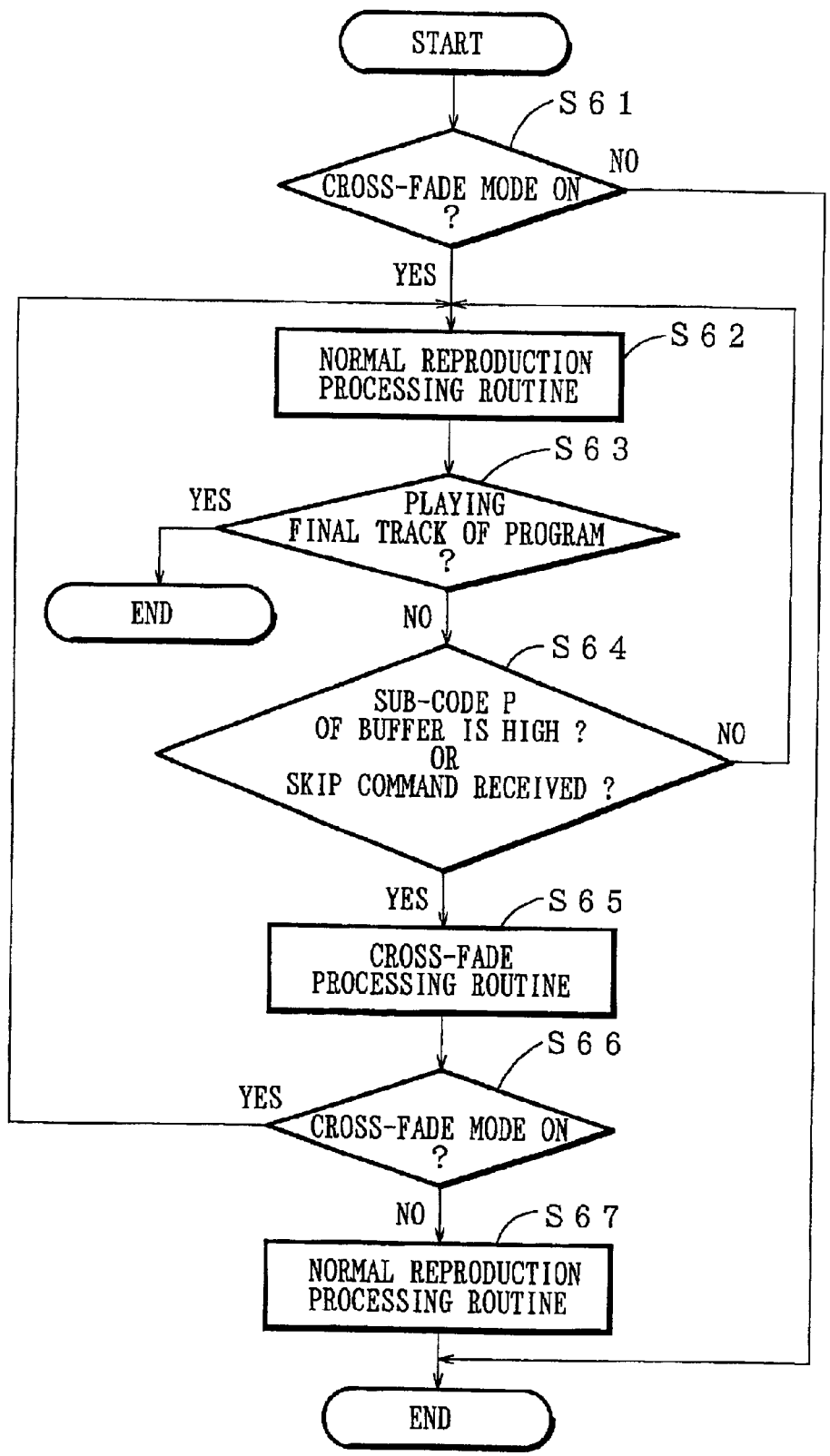
FIG. 9 is a flowchart for explaining the operation in another embodiment of the invention.
Figure 10:
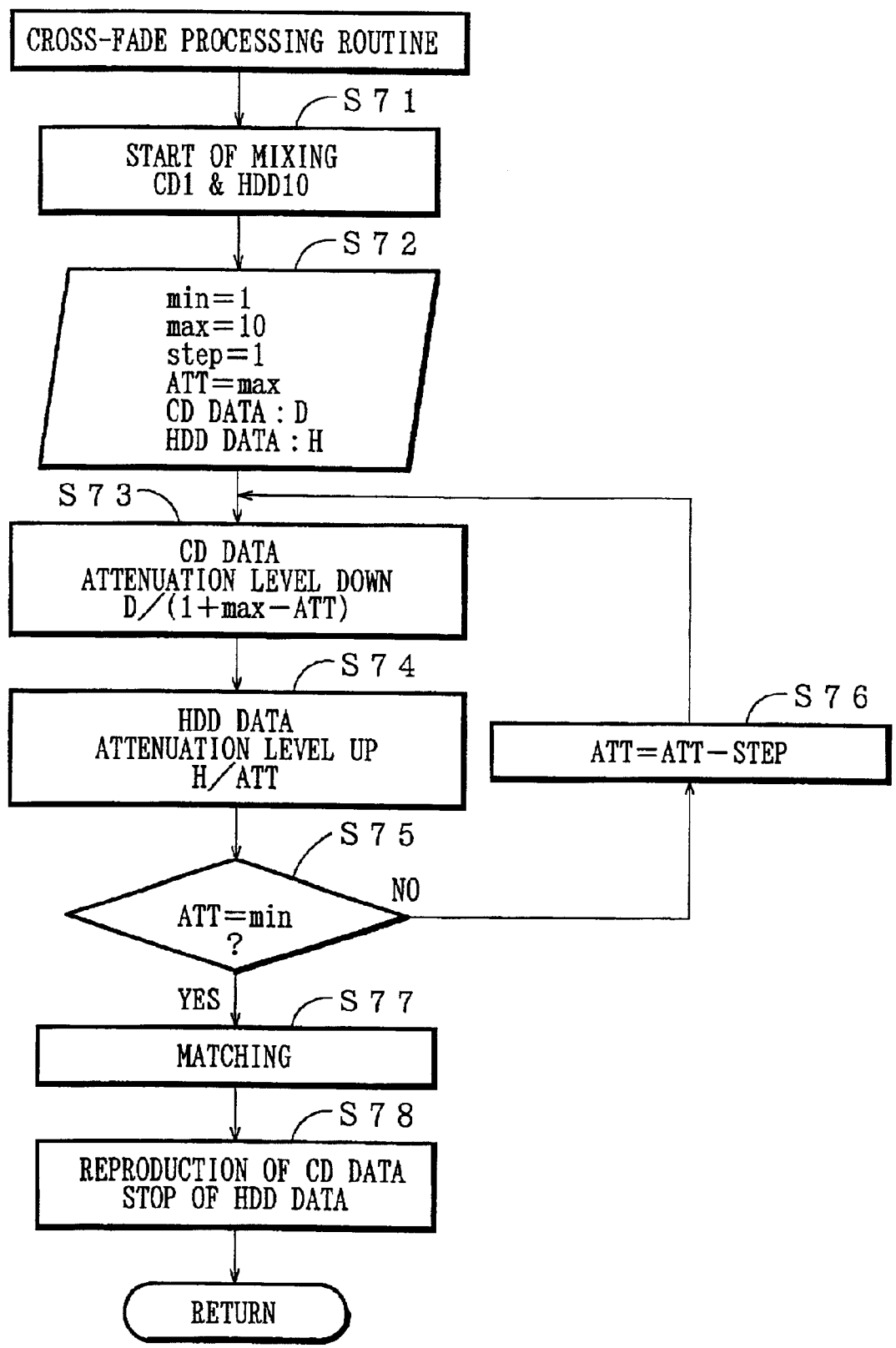
FIG. 10 is a flowchart for explaining the operation of cross fade processing in another embodiment.

FIGS. 9 to 11 are views for explaining the special reproduction effectively using the beginning data written in the HDD 1. This special playback includes a cross-fade main processing and cross-fade subroutine processing during normal playback or skip selection.

Referring to FIGS. 9 and 10, an explanation will be given of the special playback in the arrangement of the recording/reproducing apparatus according to the invention shown in FIG. 1 for two cases where the beginning data have been already written and where the special playback is performed while the beginning data are written in the HDD.

(1) The Case Where the Beginning Data Have Been Written in the HDD

The system controller 7 determines whether or not the cross fade mode has been set by a user (step S61). If YES, the processing enters the normal playback(step S62). Further, whether or not the track at issue is the last track of a playing program is determined (step S63). If YES, the normal playback will be ended.

If NO, for the purpose of actuating the function of fade-out and fade-in, in order to detect the end of the track being reproduced, the beginning of a next-programmed track or the pause between therebetween, the system controller 7 monitors the audio data supplied to the DSP 6, e.g. the state of the P channel within the sub-code information contained in the audio data (step S64). The sub-code P indicates the pause between the tracks as "HIGH" and the middle of the track as "LOW". Therefore, by monitoring the sub-code P, the pause between the tracks can be detected.

If the sub-code P is "LOW", it means that the track is being reproduced. Therefore, the normal playback processing (step S62) is continued to detect the pause between the tracks.

If the sub-code is "HIGH", the cross-fade sub-routine as shown in FIG. 10 is started (step S65). As described below, on the basis of the checking result of the P-channel, the control of the attenuators A and B (14, 15) is started to determine the timing of the cross-fade.

Next, whether or not the cross-fade mode has been set by the user is checked again (step S66). This is performed to deal with the case where the cross-fade mode is released halfway. If YES, the processing is returned to step S62 to repeat the normal playback described above. If NO, since the cross-fade processing has been released halfway, the normal playback is performed (step S67).

Additionally, in step S64, not only when the pause is detected, but also when a skip command (search command) is executed, the system controller 7 receives this command to start the cross-fade processing routine described below.

As described above, in the case of the CD, the P channel of the sub-code is used to detect the pause between the tracks. In the case of the other recording media, any information capable of detecting the pause may be adopted. Further, any information capable of detecting the start or end of the track can be adopted. For example, the data indicative of the absolute starting time of each track can be used.

An explanation will be given of the cross-fade subroutine shown in FIG. 10.

When the cross-fade sub-routine is started, the mixing of the CD 1 and HDD 10 is made by the adder 11 (step S71). Specifically, the audio data which is being reproduced is supplied to the adder 11 through the buffer memory (A) 8 and the attenuator 14. The audio data of the next-programmed track is also supplied to the adder 11 through the buffer memory (B) 9 and attenuator 15. These data are mixed in the adder 11. In this case, in order to determine the attenuating or amplifying quantity for the attenuators (A) and (B) 14 and 15, ten quantity values of variable ATT from 1 (min) to 10 (max) are set and looped with a step of +1. Now, assuming that the attenuation quantity of the CD 1 is D and that of the HDD 10 is "H", the variable ATT is set at the maximum of 10 (step S72). The attenuation quantity of the CD 1 is stepped down by calculating "1+max–ATT" (step S73).

The attenuation quantity of the HDD 1 is stepped up by setting it at the max of "10". Then, until the variable ATT becomes the min of "1", the calculation of "variable ATT–step amount" is repeated (step S75) so that the respective attenuation quantities D and H of the CD1 and HDD 1 are gradually stepped up or down.

Thus, the end portion of the track being reproduced and the starting portion of the next-programmed track are caused to cross-fade and produced as sound from the speaker through the D/A converter 12.

Since only the beginning audio data of the next-programmed track has been written in the HDD 10, the addresses of the portion of the audio data in the HDD 10 and that of the CD 1 to be reproduced subsequently thereto are matched to make sound continuous (sound matching) (step S77). The addresses are changed so that the data reproduction is shifted from the HDD 10 to the CD 1 (step S78).

FIGS. 11A to 11D are timing charts for explaining the operation of the cross-fade processing. Specifically, FIG. 11A shows the data read from the HDD 10 (written into the buffer memory (B) 9). FIG. 11B shows the data produced from the attenuator (B) 15. FIG. 11C shows the data from the CD 1 (written into the buffer memory (A) 8). FIG. 11D shows the data produced from the attenuator (A) 14. FIG. 11E shows the data (audio data) produced from the adder 11.

In operation, while the track a of the CD 1 is reproduced (FIG. 11C), when the P channel is detected or the skip command is executed, the cross-fade processing is started. As regards the output from the adder 11 (FIG. 11E), the P channel which is time information is detected before the audio data of the CD 1 is completed. This is because when the audio data is supplied to the DSP 6 capable of detecting the P channel, the audio data produced from the adder 11 is the audio data immediately before completion of the track at issue. On the basis of such a prescribed time lag, the cross-fade processing between the audio data immediately before its completion and that of the next-programmed track can be realized.

When the cross-fade processing is started, the beginning audio data of the next-programmed track (track b) is read from the HDD 10 (FIG. 11A). Simultaneously, the fade-out of the output from the attenuator (A) 14 is started (FIG. 11D), whereas the fade-in of the output from the attenuator (B) 15 is started (FIG. 11B). The outputs from both attenuators (A) an (B) 14 and 15 are mixed by the adder 11 (FIG. 11E).

In this way, the cross-fade processing produces the data when the beginning of the track b which is the next audio data written in the HDD 10 is superimposed on the ending portion of the track a which is the audio data of the CD while the CD 1 is being reproduced. In this case, the respective audio data are subjected to fade-out or fade-in so that the audio data is continuously reproduced in the cross-fade manner. Accordingly, the successive tracks can be continuously coupled with no gap.

Further, the beginning audio data of the track of the next-programmed track and the beginning audio data of the track successive thereto are bound. Specifically, while the audio data at the beginning of the track b is reproduced, the pick-up unit 2 executes the searching for the track b to read the data at the address An et seq. Since the beginning audio data are located at the addresses A0–A(n–1), the matching of the audio data on the track b is made by the adder 11. The attenuating degree of the attenuator (A) 14 is returned to the initial value.

Thus, as seen from FIG. 1E, the audio data on the track a and that on the track b are subjected to the cross-fade processing, and the audio data on the track b is subjected to the matching processing.

(2) Case Where the Beginning Data Have Not Been Written

In this case, the method of recording the beginning data during the normal reproduction may be applied to the normal playback processing routine in step S62 in the flowchart of FIG. 9.

In the normal playback processing routine in step S62, the read from the CD may be executed at the speed of N-times, and the date thus read may be successively written/held in the HDD 10. In the course of this process, when the P channel is detected, the cross-fade routine is started.

As described above, since the cross-fade control is executed using the information obtained from the recording medium such as a CD and a part of the beginning information written in prescribed groups in the internal storage means such as a HDD, the information written in the recording media can be continuously reproduced also when the searching for the recording medium and medium exchange is made. Therefore, the information written in the internal storage means can be effectively used.

When the track search command or CD change command is issued, by detecting the end of the group being reproduced such as the pause between tracks or the beginning of a group successive to the group being reproduced, the fade-out is started using the output from the one attenuator whereas the fade-in is started using the output from the other attenuator. The outputs from both attenuators are mixed by the adder so that the beginning of the next-programmed audio data written in the HDD is superimposed on the end of the audio data being reproduced. Thus, the audio data can be continuously reproduced in the cross-fade manner (fade-out and fade-in). Otherwise, using the P-channel of the sub-code in the CD format and PTT in the DVD format, the cross-fade processing can be started. In this case, the timing of starting the cross-fade processing can be easily determined using the existing information.

The continuous reproduction of the audio data using the cross-fade processing also provides the effect of the sense of play of binding the tracks with no stop.

Although the embodiment of the present invention was explained in connection with a CD changer, the present invention can be applied to an MD changer. The present invention can be also applied to an ordinary player for the recording medium. Further, the present invention can be also applied to the recording/reproducing the video data as well as the audio data.

What is claimed is:

1. A recording/reproducing apparatus comprising;
   storage means for storing information read from a recording medium on which the information is written in a prescribed number of groups;
   means for reading the information on said recording medium; and
   control means for controlling the write in said storage means of at least a prescribed time or quantity of information corresponding to a beginning address of each of said groups,
   wherein the information on said storage means read at a speed which is higher than or equal to a speed at which the information is reproduced,
   wherein said control means controls the write of the information read from said recording medium while it controls reproduction of the information written in said storage means at any time, and
   wherein said control means causes a prescribed time or quantity of information written in said storage means to be held therein and the other information written in said storage means to be held therein and the other information to be discarded after reproduction.

2. A recording/reproducing apparatus according to claim 1, wherein said means for reading reads the information on said recording medium at a speed of N-times as high as a normal speed.

3. A recording/reproduction apparatus according to claim 1, wherein said control means correlatively manages said prescribed time or quantity of information written in said storage means and the recording medium in which it has been written.

4. A recording/reproducing apparatus according to claim 1, further comprising:
   a holding member for holding a plurality of recording media, wherein
   said control means causes said storage means to store said prescribed time or quantity of information relative to all said recording media held in said holding member.

5. A recording/reproducing apparatus according to claim 4, wherein after said control means causes said storage means to store said prescribed time or quantity of information relative to all said recording media held in said holding member, it continues reproduction using the information remaining in said storage means.

6. A recording/reproducing apparatus according to claim 4, wherein after said control means causes said storage means to store said prescribed time or quantity of information relative to all said recording media held in said holding member, it continues reproduction using the information recording in said recording media.

7. A recording/reproducing apparatus according to claim 1, wherein said recording means is a compact disk and said storage means is a hard disk drive.

8. The recording/reproducing apparatus according to claim 1, wherein said control means cross-fades each of said groups with a subsequent group, such that information is continuously reproduced.

9. The recording/reproducing apparatus according to claim 1, wherein said control means controls the write in said storage means of at least the prescribed time of information corresponding to a beginning address of each of said groups.

10. The recording/reproducing apparatus according to claim 1, wherein said control means controls the write in said storage means of at least the prescribed quantity of information corresponding to a beginning address of each of said groups.

11. A recording/reproducing apparatus comprising:
   storage means for storing information read from a recording medium on which the information is written in a prescribed number of groups;
   means for reading the information on said recording medium; and
   control means for controlling the write in said storage means of at least a prescribed time or quantity of information corresponding to a beginning address of each of said groups,
   wherein the information in said storage means is read at a speed which is higher than or equal to a speed at which the information is reproduced,
   wherein said control means correlatively manages said prescribed time or quantity of information written in said storage means and the recording medium in which it has been written;
   and further comprising:
   means for detecting identification information for identifying said recording medium, wherein where said prescribed time or quantity of information contained in the recording medium identified by said identifying means has been already written in said storage means, said control means inhibits storage of the information into said storage means.

12. A recording/reproducing apparatus according to claim 11, wherein said control means controls the write of the information read from said recording medium while it controls reproduction of the information written in said storage means at any time.

13. A recording/reproducing apparatus comprising:
   a memory that stores information read from a recording medium on which the information is written in a prescribed number of groups;
   a data retrieval circuit that reads the information on said recording medium; and
   a control circuit that controls the write in said memory of at least a prescribed time or quantity of information corresponding to a beginning address of each of said groups,
   wherein the information in said memory is read to a buffer memory at a speed which is higher than or equal to a speed at which the information in said buffer memory is reproduced,
   wherein said control circuit controls the write of the information read from said recording medium while it controls reproduction of the information written in said memory at any time,
   wherein said control circuit causes a prescribed time or quantity of information written in said memory to be held therein and the other information written in said memory to be held therein and the other information to be discarded after reproduction.

14. A recording/reproducing apparatus according to claim 13, wherein said data retrieval circuit reads the information on said recording medium at a speed of N-times as high as a normal speed.

15. A recording/reproduction apparatus according to claim 13, wherein said control circuit correlatively manages said prescribed time or quantity of information written in said memory and the recording medium in which it has been written.

16. A recording/reproducing apparatus according to claim 13, further comprising:
   a media holder that holds a plurality of recording media, wherein
   said control circuit causes said memory to store said prescribed time or quantity of information relative to all said recording media held in said media holder.

17. A recording/reproducing apparatus according to claim 16, wherein after said control circuit causes said memory to store said prescribed time or quantity of information relative to all said recording media held in said media holder, it continues reproduction using the information remaining in said memory.

18. A recording/reproducing apparatus according to claim 16, wherein after said control circuit causes said memory to store said prescribed time or quantity of information relative to all said recording media held in said media holder, it continues reproduction using the information recording in said recording media.

19. A recording/reproducing apparatus according to claim 13, wherein said recording medium is a compact disk and said memory is a hard disk drive.

20. The recording/reproducing apparatus according to claim 13, wherein said control circuit cross-fades each of said groups with a subsequent group, such that information is continuously reproduced.

21. The recording/reproducing apparatus according to claim 13, wherein said control circuit controls the write in said memory of at least the prescribed time of information corresponding to a beginning address of each of said groups.

22. The recording/reproducing apparatus according to claim 13, wherein said control circuit controls the write in said memory of at least the prescribed quantity of information corresponding to a beginning address of each of said groups.

23. A recording/reproducing apparatus comprising:
   a memory that stores information read from a recording medium on which the information is written in a prescribed number of groups;
   a data retrieval circuit that reads the information on said recording medium; and
   a control circuit that controls the write in said memory of at least prescribed time or quantity of information corresponding to a beginning address of each of said groups,
   wherein the information in said memory is read to a buffer memory at a steed which is higher than or equal to a speed at which the information in said buffer memory is reproduced,
   wherein said control circuit correlatively manages said prescribed time or quantity of information written in said memory and the recording medium in which it has been written,
   wherein the control circuit detects identification information for identifying said recording medium, wherein where said prescribed time or quantity of information contained in the recording medium identified by said control circuit has been already written in said memory, said control circuit inhibits storage of the information into said memory.

* * * * *